US011991770B2

(12) United States Patent
Liang et al.

(10) Patent No.: US 11,991,770 B2
(45) Date of Patent: May 21, 2024

(54) METHOD FOR DETECTING LINK FAILURE OF SIDELINK AND TERMINAL

(71) Applicant: VIVO MOBILE COMMUNICATION CO., LTD., Guangdong (CN)

(72) Inventors: Jing Liang, Chang'an Dongguan (CN); Xiaodong Yang, Chang'an Dongguan (CN); Qian Zheng, Chang'an Dongguan (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 431 days.

(21) Appl. No.: 17/211,567

(22) Filed: Mar. 24, 2021

(65) Prior Publication Data
US 2021/0212148 A1 Jul. 8, 2021

Related U.S. Application Data

(63) Continuation of application No. PCT/CN2019/107856, filed on Sep. 25, 2019.

(30) Foreign Application Priority Data

Sep. 25, 2018 (CN) .......................... 201811117204.8

(51) Int. Cl.
*H04W 76/19* (2018.01)
*H04W 24/10* (2009.01)
(Continued)

(52) U.S. Cl.
CPC ........... *H04W 76/19* (2018.02); *H04W 24/10* (2013.01); *H04W 76/14* (2018.02); *H04W 92/18* (2013.01)

(58) Field of Classification Search
CPC ..... H04W 76/19; H04W 24/10; H04W 76/14; H04W 92/18; H04W 76/18; H04W 24/08;
(Continued)

(56) References Cited

U.S. PATENT DOCUMENTS 10,045,386 B2 8/2018 Raghothaman et al.
2012/0320766 A1 12/2012 Sridhar
(Continued)

FOREIGN PATENT DOCUMENTS

CN 102143522 A 8/2011
CN 104080170 A 10/2014
(Continued)

OTHER PUBLICATIONS

JP Office Action dated Dec. 27, 2022 as received in Application No. 2021-516884.
(Continued)

*Primary Examiner* — Minh Trang T Nguyen
(74) *Attorney, Agent, or Firm* — Price Heneveld LLP

(57) ABSTRACT

This disclosure discloses a method for detecting link failure of a sidelink and a terminal. The method includes: transmitting target information through a sidelink, where the target information includes a first reference signal or a data packet; and determining, if a transmission status of the target information meets a preset criterion, that no link failure occurs on the sidelink, and determining, if otherwise, that link failure occurs on the sidelink.

20 Claims, 6 Drawing Sheets

(51) Int. Cl.
*H04W 76/14* (2018.01)
*H04W 92/18* (2009.01)

(58) Field of Classification Search
CPC ... H04L 41/0668; H04L 5/0044; H04L 5/005; H04L 5/0051; H04L 5/0055; H04L 5/0058; H04L 5/0062; H04L 43/0811; H04L 5/0048
See application file for complete search history.

(56) References Cited

U.S. PATENT DOCUMENTS

| | | |
|---|---|---|
| 2013/0324114 A1 | 12/2013 | Raghothaman et al. |
| 2014/0036659 A1 | 2/2014 | Gao |
| 2016/0219620 A1 | 7/2016 | Lee et al. |
| 2016/0286374 A1 | 9/2016 | Baghel et al. |
| 2017/0041902 A1* | 2/2017 | Sheng .................. H04W 72/02 |
| 2017/0127405 A1 | 5/2017 | Agiwal et al. |
| 2017/0150302 A1 | 5/2017 | Sorrentino et al. |
| 2017/0181011 A1 | 6/2017 | Yu et al. |
| 2017/0230926 A1 | 8/2017 | Seo et al. |
| 2018/0049142 A1 | 2/2018 | Yang et al. |
| 2019/0274180 A1 | 9/2019 | Yu et al. |
| 2019/0320361 A1 | 10/2019 | Uchiyama et al. |
| 2019/0349895 A1 | 11/2019 | Liu et al. |

FOREIGN PATENT DOCUMENTS

| | | |
|---|---|---|
| CN | 104703224 A | 6/2015 |
| CN | 105050152 A | 11/2015 |
| CN | 106664675 A | 5/2017 |
| CN | 106993260 A | 7/2017 |
| CN | 107071713 A | 8/2017 |
| CN | 108347313 A | 7/2018 |
| CN | 108365997 A | 8/2018 |
| CN | 108377577 A | 8/2018 |
| JP | 2015-521455 A | 7/2015 |
| JP | 2015-521455 A5 | 7/2015 |
| JP | 2018-026625 A | 2/2018 |
| KR | 2014-0023393 A | 2/2014 |
| KR | 2017-0132165 A | 12/2017 |
| WO | 2018030007 A1 | 2/2018 |
| WO | 2018/145787 A1 | 8/2018 |

OTHER PUBLICATIONS

JP Office Action dated Jun. 14, 2022 as received in Application No. 2021-516884.
IN Office Action dated May 19, 2022 as received in Application No. 202127018789.
KR Office Action dated May 27, 2022 as received in Application No. 10-2021-7012142.
Fujitsu, "Discussion on Sidelink Bi-mode Transmission in NR-V2X," 3GPP TSG-RAN WG1 Meeting#94, R1-1809775, pp. 1-5, (Aug. 24, 2018).
Written Opinion of the International Searching Authority dated Apr. 8, 2021 as received in Application No. PCT/CN2019/107856.
CN Office Action dated Oct. 9, 2020 as received in Application No. 201811117204.8.
CN Office Action dated Jun. 21, 2021 as received in Application No. 201811117204.8.
European Search Report dated Nov. 10, 2021 at received in application No. 19868000.1.

* cited by examiner

METHOD FOR DETECTING LINK FAILURE OF SIDELINK AND TERMINAL

CROSS-REFERENCE TO RELATED APPLICATIONS

This application is a continuation application of International Application No. PCT/CN2019/107856 filed on Sep. 25, 2019, which claims priority to Chinese Patent Application No. 201811117204.8, filed in China on Sep. 25, 2018, which is incorporated herein by reference in its entirety.

TECHNICAL FIELD

This disclosure relates to the field of communications technologies, and in particular, to a method for detecting link failure of a sidelink and a terminal.

BACKGROUND

In a mobile communication system, a sidelink, also referred to as a side link, a sidelink, a sidelink, or the like, is used for direct transmission between terminals without using a network device. A terminal sends sidelink control information (SCI) over a physical sidelink control channel (PSCCH), to schedule transmission of a physical sidelink shared channel (PSSCH) for data transmission. Sidelink transmission is based on broadcast, and a receive end terminal does not give feedback on whether reception is successful to a transmit end terminal.

Sidelink transmission supports two resource allocation modes. One is scheduled resource allocation, in which mode a network device controls and allocates resources for all terminals, and the other is autonomous resource selection, in which mode terminals select resources autonomously.

The network device configures a sidelink discovery or transmission resource pool for the terminal. The resource pool includes resource information and related transmission parameters for use in a sidelink discovery or transmission process, for example, an offset value of the first subframe of the resource pool, a bitmap corresponding to the resource pool, whether a PSCCH and a PSSCH are to be transmitted in adjacent resource blocks (RB), a quantity of subchannels, a size of each subchannel, a smallest RB index corresponding to a subchannel, a smallest RB index corresponding to a PSCCH pool, a sidelink received signal strength indicator (S-RSSI) threshold measured by using a channel busy rate (CBR), and an area identity.

In related technologies, sidelink transmission includes unicast, multicast (or referred to as multicast), and broadcast. In a sidelink transmission mechanism, neither a receive end terminal nor a transmit end terminal can determine a link state of a sidelink. When the sidelink fails, the receive end terminal and the transmit end terminal continue transmission attempts because they are unable to know that the link has failed. This not only affects transmission performance, but also causes unnecessary waste of resources.

SUMMARY

According to a first aspect, an embodiment of this disclosure provides a method for detecting link failure of a sidelink, applied to a terminal, where the method includes:

transmitting target information through a sidelink, where the target information includes a first reference signal or a data packet; and determining, if a transmission status of the target information meets a preset criterion, that no link failure occurs on the sidelink, and determining, if otherwise, that link failure occurs on the sidelink.

According to a second aspect, an embodiment of this disclosure further provides a terminal, including:

a transmission module, configured to transmit target information through a sidelink, where the target information includes a first reference signal or a data packet; and a processing module, configured to determine, if a transmission status of the target information meets a preset criterion, that no link failure occurs on the sidelink, and determine, if otherwise, that link failure occurs on the sidelink.

According to a third aspect, an embodiment of this disclosure provides a terminal, where the terminal includes a processor, a memory, and a computer program stored in the memory and running on the processor, and when the computer program is executed by the processor, steps of the foregoing method for detecting link failure of a sidelink are implemented.

According to a fourth aspect, an embodiment of this disclosure provides a computer-readable storage medium, where the computer-readable storage medium stores a computer program, and when the computer program is executed by a processor, steps of the foregoing method for detecting link failure of a sidelink for determining a radio link state are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances, so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

Figure 1:
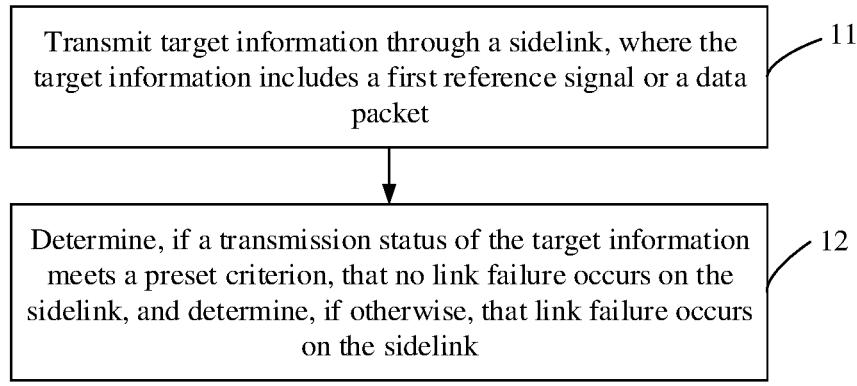
FIG. 1 is a schematic flowchart of a method for detecting link failure of a sidelink according to an embodiment of this disclosure.

An embodiment of this disclosure provides a method for detecting link failure of a sidelink, applied to a terminal. As shown in FIG. 1, the method includes the following steps.

Step 11: Transmit target information through a sidelink, where the target information includes a first reference signal or a data packet.

Transmission herein may refer to sending or receiving. In other words, the terminal in this embodiment of this disclosure may serve as a transmit end and a receive end. Whether the terminal serves as a transmit end or a receive end may specifically depend on network device scheduling, other terminal scheduling, a service requirement, or the like.

The first reference signal includes at least one of the following: a primary synchronization signal (PSS), a secondary synchronization signal (SSS), a channel state information reference signal (CSI-RS), a demodulation reference signal (DMRS), a phase tracking reference signal (PTRS), a tracking reference signal (TRS), a sounding reference signal (SRS), and a first dedicated reference signal, where the first dedicated reference signal is used for link failure detection.

Step 12: Determine, if a transmission status of the target information meets a preset criterion, that no link failure occurs on the sidelink, and determine, if otherwise, that link failure occurs on the sidelink.

The target information includes the first reference signal or the data packet. When the target information is the first reference signal, before step 12, the method further includes: detecting whether a transmission status of the first reference signal meets a first preset criterion within a time interval. Correspondingly, step 12 includes: determining, if the transmission status of the first reference signal meets a first preset criterion, that no link failure occurs on the sidelink, and determining, if otherwise, that is, if the transmission status of the first reference signal does not meet at least one of the first preset criterion, that link failure occurs on the sidelink.

Alternatively, when the target information is the data packet, before step 12, the method further includes: detecting whether a transmission status of the data packet meets a second preset criterion within a time interval. Correspondingly, step 12 includes: determining, if a transmission status of the data packet meets the second preset criterion, that no link failure occurs on the sidelink, and determining, if otherwise, that is, if the transmission status of the data packet does not meet at least one of the second preset criterion, that link failure occurs on the sidelink.

The time interval is a predefined (for example, agreed in a protocol) or preconfigured (for example, preconfigured by a terminal at factory, configured or preconfigured by a network device, or configured by a terminal) time interval, that is, the time interval is an absolute value. Alternatively, the time interval is a predefined or preconfigured first timer, that is, the terminal maintains a timer.

Further, when the terminal serves as a transmit end, a startup criterion and/or restart criterion of the first timer is different from that of the first timer when the terminal serves as a receive end. Details are as follows:

When the terminal is a receive end, startup time of the first timer includes at least one of the following:
predefined or preconfigured first time, and
time when the target information is received.
When the terminal is a transmit end, startup time of the first timer includes at least one of the following:
predefined or preconfigured second time, and
time after the target information is sent.
When the terminal is a receive end, the restart criterion of the first timer includes at least one of the following:
that the transmission status of the target information meets the preset criterion, and
that a data packet other than the target information is received.
When the terminal is a transmit end, the restart criterion of the first timer includes at least one of the following:
that the transmission status of the target information meets the preset criterion, and
that a data packet other than the target information is sent.

It also should be noted that when the terminal serves as a transmit end, the startup time, duration, or expiration time of the first timer is the same as or different from that of the first timer when the terminal serves as a receive end. When the target information is the first reference signal, startup time, duration, or expiration time of the first timer is the same or different from that of the first timer when the target information is the data packet.

Further, when the terminal serves as a transmit end, a link failure detection manner of the sidelink is different from that of the sidelink when the terminal serves as a receive end. The following embodiment further describes the method for detecting link failure with reference to different scenarios.

Example 1: The terminal is a receive end, and the target information is the first reference signal.

Figure 2:
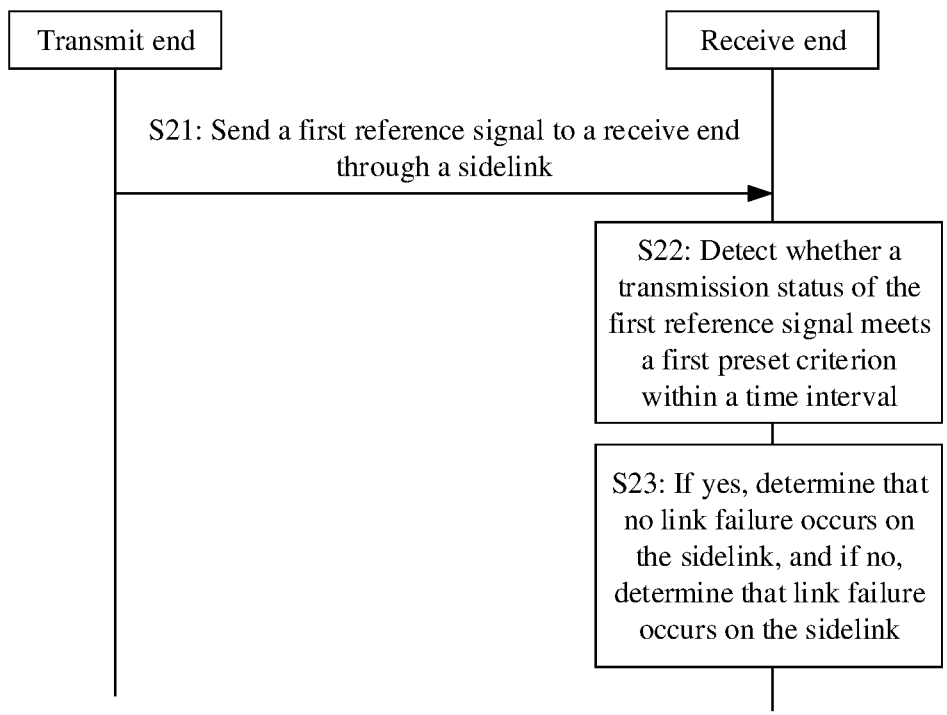
FIG. 2 is a schematic flowchart of Example 1 according to an embodiment of this disclosure.

In this example, as shown in FIG. 2, the method includes the following steps:

Step 21: A transmit end sends the first reference signal to the receive end through the sidelink, and correspondingly, the receive end receives the first reference signal through the sidelink.

Step 22: The receive end detects whether the transmission status of the first reference signal meets the first preset criterion within the time interval.

Step 23: If yes, determine that no link failure occurs on the sidelink, and if no, determine that link failure occurs on the sidelink.

The first preset criterion includes at least one of the following:
that the first reference signal is received, where that the first reference signal is received herein means the receive end terminal successfully receives and demodulates the first reference signal; and
that a measurement result of the first reference signal exceeds a first preset threshold, where the measurement result includes but is not limited to at least one of reference signal received power (RSRP), reference signal received quality (RSRQ), and a signal-to-interference-plus-noise ratio (SINR), that is, that RSRP/RSRQ/SINR of the first reference signal measured by the receive end terminal is greater than or equal to a preset threshold, where the preset threshold may be configured by a network device, agreed in a protocol, or preconfigured for the receive end terminal.

That the transmission status of the first reference signal does not meet the first preset criterion includes at least one of the following:

that the first reference signal is not received, or that a measurement result of one or more first reference signals is less than a second preset threshold.

Specifically, in this example, the receive end terminal determines a connection status of a unicast or multicast link of the sidelink based on whether the first preset criterion of the first reference signal is met within a specific time interval.

The time interval may be an absolute value, or may be implemented by maintaining a timer by the receive end terminal. The absolute value of the time interval or a determining criterion of the timer may be any combination of one or more of the following: being agreed in advance in a protocol, being configured by the receive end terminal, being preconfigured by the terminal at factory, and being configured or preconfigured by the network device.

When the receive end terminal maintains the first timer, the startup time of the first timer, that is, time when the first timer is started up for the first time, includes at least one of the following: predefined or preconfigured first time, and time when the receive end terminal receives the first reference signal.

During timing of the first timer, the first timer may be restarted if at least one of the restart criterion is met. The restart criterion of the first timer includes at least one of the following: that the first preset criterion of the first reference signal is met, and that a data packet sent by the transmit end terminal other than the first reference signal is received. If the restart criterion is not met, the first timer continues counting until the first timer expires. If the first timer expires, it may be determined that the unicast or multicast link of the sidelink fails, and the terminal may perform subsequent processes such as failure reporting, link recovery, link re-establishment, link changing, and link release.

Example 2: The terminal is a transmit end, and the target information is the first reference signal.

Figure 3:
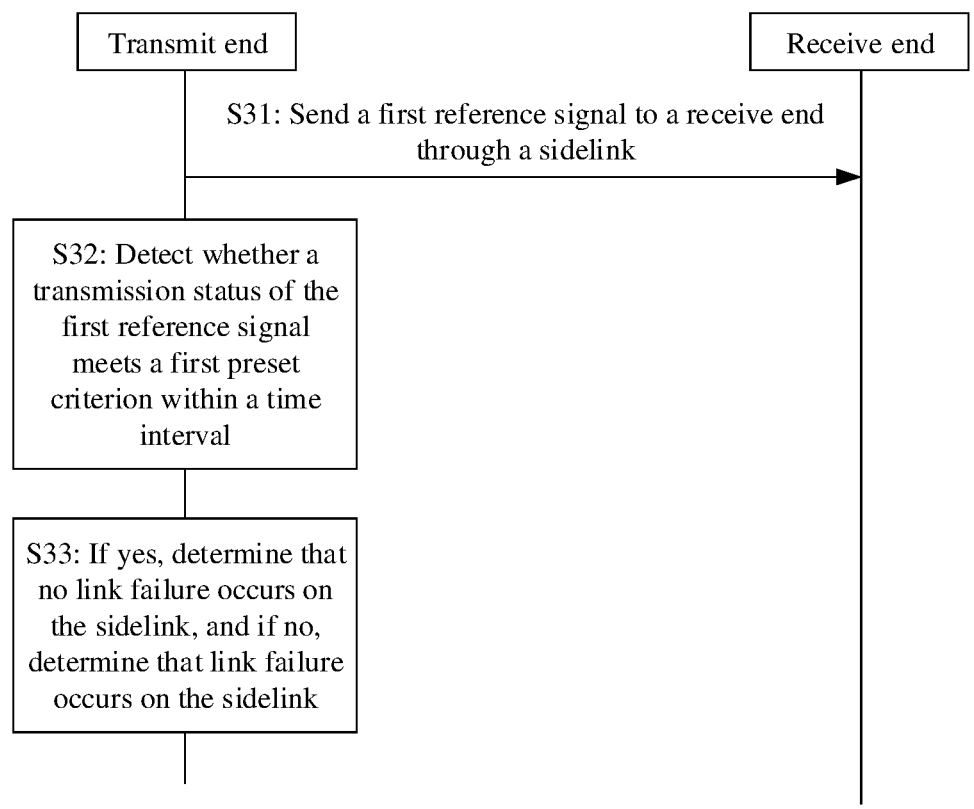
FIG. 3 is a schematic flowchart of Example 2 according to an embodiment of this disclosure.

In this example, as shown in FIG. 3, the method includes the following steps:

Step 31: The transmit end sends the first reference signal to a receive end through the sidelink, and correspondingly, the receive end receives the first reference signal through the sidelink.

Step 32: The transmit end detects whether the transmission status of the first reference signal meets the first preset criterion within the time interval.

Step 33: If yes, determine that no link failure occurs on the sidelink, and if no, determine that link failure occurs on the sidelink.

The first preset criterion includes at least one of the following:

that reception feedback information of the first reference signal being an acknowledgment character (ACK) is received or detected, where that reception feedback information of the first reference signal is received or detected herein means the transmit end terminal successfully receives or detects effective feedback of the first reference signal, that a quantity of failed transmissions of the first reference signal is less than a first number, and that a quantity of retransmissions of the first reference signal is less than a second number, for example, a quantity of hybrid automatic repeat requests (HARQ) or a quantity of retransmissions at the radio link control (RLC) layer.

It should be noted that the first number and the second number may be configured by a network device, agreed in a protocol, or preconfigured for the transmit end terminal.

That the first reference signal does not meet the first preset criterion includes:

that no reception feedback information of one or more first reference signals is received or detected, or that reception feedback information of one or more first reference signals being negative acknowledgment (NACK) is received or detected.

Specifically, in this example, the transmit end terminal determines a connection status of a unicast or multicast link of the sidelink based on whether the first preset criterion of the first reference signal is met within a specific time interval.

The time interval may be an absolute value, or may be implemented by maintaining a timer by the transmit end terminal. The absolute value of the time interval or a determining criterion of the timer may be any combination of one or more of the following: being agreed in advance in a protocol, being configured by the receive end terminal, being preconfigured by the terminal at factory, and being configured or preconfigured by the network device.

When the transmit end terminal maintains the first timer, the startup time of the first timer, that is, time when the first timer is started up for the first time, includes at least one of the following: predefined or preconfigured second time, and after the first reference signal is sent.

During timing of the first timer, the first timer may be restarted if at least one of the restart criterion is met. The restart criterion of the first timer includes at least one of the following: that the transmission status of the first reference signal meets the first preset criterion, and that a data packet other than the first reference signal is sent. If the restart criterion is not met, the first timer continues counting until the first timer expires. If the first timer expires, it may be determined that the unicast or multicast link of the sidelink fails, and the terminal may perform subsequent processes such as failure reporting, link recovery, link re-establishment, link changing, and link release.

Example 3: The terminal is a receive end, and the target information is the data packet.

Figure 4:
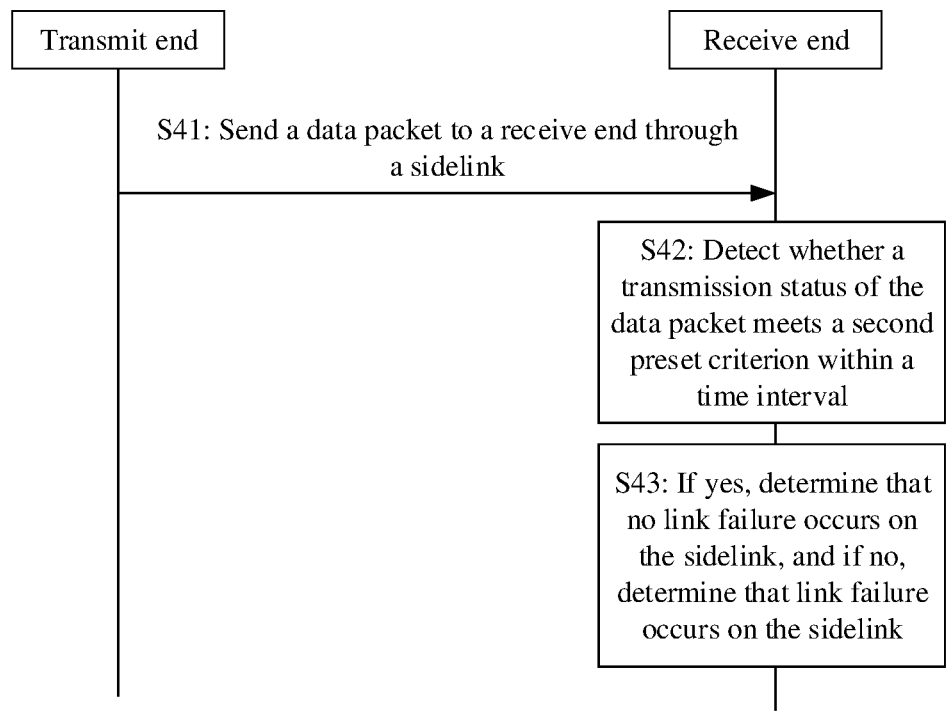
FIG. 4 is a schematic flowchart of Example 3 according to an embodiment of this disclosure.

In this example, as shown in FIG. 4, the method includes the following steps:

Step 41: A transmit end sends the data packet to the receive end through the sidelink, and correspondingly, the receive end receives the data packet through the sidelink.

Step 42: The receive end detects whether the transmission status of the data packet meets the second preset criterion within the time interval.

Step 43: If yes, determine that no link failure occurs on the sidelink, and if no, determine that link failure occurs on the sidelink.

The second preset criterion includes at least one of the following:

that the data packet is received, where that the data packet is received herein means the receive end terminal successfully receives and demodulates the data packet, and that a transmission quality parameter of the data packet meets a preset requirement, where the transmission quality parameter includes at least one of delay, a packet loss rate, a transmission rate, and a communication range.

That the transmission status of the data packet does not meet the second preset criterion includes:

that the data packet is not received, or that a transmission quality parameter of the data packet does not meet a preset requirement, where the transmission quality parameter includes at least one of delay, a packet loss rate, a transmission rate, and a communication range.

Further, that a transmission quality parameter of the data packet meets a preset requirement includes but is not limited to:

that delay of the data packet is less than a first threshold, that a packet loss rate of the data packet is less than a second threshold, that a transmission rate of data packets is greater than a third threshold, that a communication range of the data packet is greater than a fourth threshold or less than a fifth threshold.

The first threshold, the second threshold, the third threshold, the fourth threshold, and the fifth threshold may be configured by a network device, agreed in a protocol, or preconfigured for the receive end terminal.

Specifically, in this example, the receive end terminal determines a connection status of a unicast or multicast link of the sidelink based on whether the data packet meets the second preset criterion within a specific time interval.

The time interval may be an absolute value, or may be implemented by maintaining a timer by the receive end terminal. The absolute value of the time interval or a determining criterion of the timer may be any combination of one or more of the following: being agreed in advance in a protocol, being configured by the receive end terminal, being preconfigured by the terminal at factory, and being configured or preconfigured by the network device.

When the receive end terminal maintains the first timer, the startup time of the first timer, that is, time when the first timer is started up for the first time, includes at least one of the following: predefined or preconfigured first time, and time when the receive end terminal receives the first reference signal.

During timing of the first timer, the first timer may be restarted if at least one of the restart criterion is met. The restart criterion of the first timer includes at least one of the following: that the second preset criterion of the data packet is met, and that another data packet sent by the transmit end terminal other than the data packet is received. If the restart criterion is not met, the first timer continues counting until the first timer expires. If the first timer expires, it may be determined that the unicast or multicast link of the sidelink fails, and the terminal may perform subsequent processes such as failure reporting, link recovery, link re-establishment, link changing, and link release.

Example 4: The terminal is a transmit end, and the target signal is the data packet.

Figure 5:
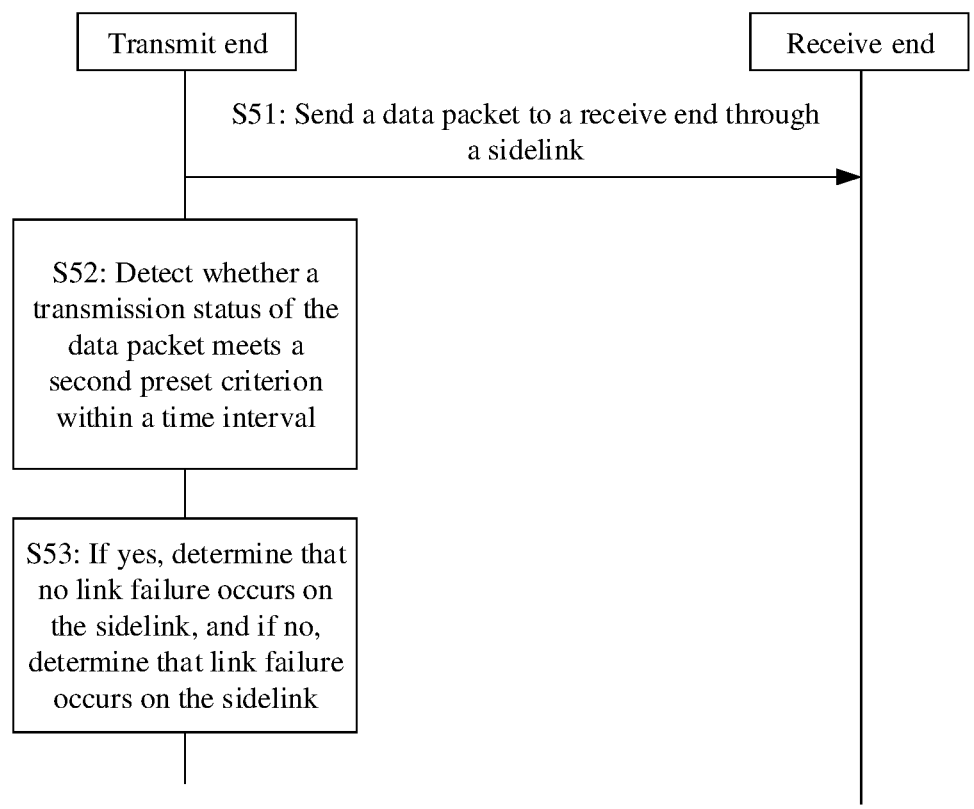
FIG. 5 is a schematic flowchart of Example 4 according to an embodiment of this disclosure.

In this example, as shown in FIG. 5, the method includes the following steps:

Step 51: The transmit end sends the data packet to a receive end through the sidelink, and correspondingly, the receive end receives the data packet through the sidelink.

Step 52: The transmit end detects whether the transmission status of the data packet meets the second preset criterion within the time interval.

Step 53: If yes, determine that no link failure occurs on the sidelink, and if no, determine that link failure occurs on the sidelink.

The second preset criterion includes at least one of the following:

that reception feedback information of the data packet being ACK is received or detected, where that the reception feedback information of the data packet is received or detected herein means the transmit end terminal successfully receives or detects effective feedback of the data packet;

that a quantity of failed transmissions of the data packet is less than a third number; and that a quantity of retransmissions of the data packet is less than a fourth number, for example, a quantity of HARQs and a quantity of retransmissions at the RLC layer.

It should be noted that the first number and the second number may be configured by a network device, agreed in a protocol, or preconfigured for the transmit end terminal.

That the data packet does not meet the second preset criterion includes:

that no reception feedback information of one or more data packets is received or detected; or that reception feedback information of one or more data packets being NACK is received or detected.

Specifically, in this example, the transmit end terminal determines a connection status of a unicast or multicast link of the sidelink based on whether the second preset criterion of the data packet is met within a specific time interval.

The time interval may be an absolute value, or may be implemented by maintaining a timer by the transmit end terminal. The absolute value of the time interval or a determining criterion of the timer may be any combination of one or more of the following: being agreed in advance in a protocol, being configured by the receive end terminal, being preconfigured by the terminal at factory, and being configured or preconfigured by the network device.

When the transmit end terminal maintains the first timer, the startup time of the first timer, that is, time when the first timer is started up for the first time, includes at least one of the following: predefined or preconfigured second time, and after the first reference signal is sent.

During timing of the first timer, the first timer may be restarted if at least one of the restart criterion is met. The restart criterion of the first timer includes at least one of the following: that the transmission status of the second preset criterion of the data packet is met, and that another data packet other than the data packet is sent. If the restart criterion is not met, the first timer continues counting until the first timer expires. If the first timer expires, it may be determined that the unicast or multicast link of the sidelink fails, and the terminal may perform subsequent processes such as failure reporting, link recovery, link re-establishment, link changing, and link release.

Further, in this embodiment of this disclosure, when the terminal is a transmit end, the step of step 11 includes: sending the target information through the sidelink according to a preset rule, where the preset rule includes at least one of the following sending rules: sending in a preset time period, sending on a preset frequency, and sending on a preset beam. Correspondingly, when the terminal is a receive end, the receive end receives the target information on the sidelink according to a preset rule.

The sending the target information in a preset time period may mean sending periodically, for example, sending the target information at specific intervals. The preset time period is a predefined (for example, agreed in a protocol) or preconfigured (for example, preconfigured by a terminal at factory, configured or preconfigured by the network device, or configured by a terminal) time interval, that is, the time interval is an absolute value. Alternatively, the preset time period is a predefined or preconfigured second timer, that is, the transmit end terminal maintains a timer.

Startup time of the second timer includes at least one of the following:
predefined or preconfigured third time, and
time after the target information is sent for the first time.
A restart criterion of the second timer includes at least one of the following:
that the target information is sent, and
that a data packet other than the target information is sent, where
transmission of the target information starts when the second timer expires.

When the target information is the first reference signal, and when the transmit end terminal maintains a timer, if the timer expires, the transmit end sends the first reference signal to the receive end, and the timer is restarted or another identical timer is started. A restart criterion of the timer may further include that the transmit end has a data packet to be sent to the receive end other than the first reference signal. The timer may be started up for the first time when or after the transmit end sends the first reference signal, or may be started up at another time agreed in a protocol or configured by a base station/terminal.

It should be noted that the duration of the first timer and the second timer may be the same or different, and the startup times of the first timer and the second timer may also be the same or different.

Figure 6:
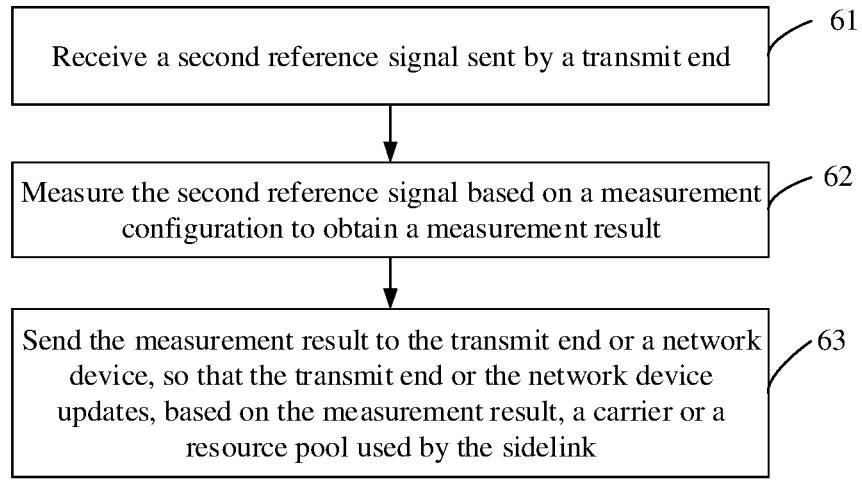
FIG. 6 is a schematic flowchart of processing after link failure of a sidelink according to an embodiment of this disclosure.

When the terminal is a receive end, after step 12, if it is determined that link failure occurs on the sidelink, as shown in FIG. 6, the receive end may also perform the following steps:

Step 61: Receive a second reference signal sent by a transmit end.

Step 62: Measure the second reference signal based on a measurement configuration to obtain a measurement result.

Step 63: Send the measurement result to the transmit end or a network device, so that the transmit end or the network device updates, based on the measurement result, a carrier or a resource pool used by the sidelink.

The measurement configuration includes but is not limited to at least one of a measurement gap configuration, a measurement target configuration, a measurement report configuration, a measurement identifier configuration, and a measurement quantity configuration.

Further, the measurement quantity configuration includes at least one of reference signal received power RSRP, a reference signal received quality RSRQ, and a signal-to-noise-plus-interference ratio SINR of the second reference signal.

Step 62 includes: when a preset measurement trigger criterion is met, measuring, by the receive end terminal, the second reference signal according to the measurement configuration in a measurement gapto obtain the measurement result. Step 63 includes: when the measurement result meets a preset measurement report trigger criterion, sending, by the receive end terminal, the measurement result to the transmit end or the network device, so that the transmit end or the network device may notify, based on the measurement result, the receive end terminal to change at a specific moment a carrier used by the sidelink or change a resource pool used by the sidelink, so as to restore a connection link of the sidelink, or the transmit end or the network device may configure a new resource pool for the sidelink based on the measurement result, and notify the receive end terminal of the new resource pool, so as to realize sidelink re-establishment or change.

The second reference signal includes at least one of the following: a primary synchronization signal PSS, a secondary synchronization signal SSS, a channel state information reference signal CSI-RS, a demodulation reference signal DMRS, a phase tracking reference signal PTRS, a tracking reference signal TRS, a sounding reference signal SRS, and a second dedicated reference signal, where the second dedicated reference signal is used for link update measurement.

A signal type of the first reference signal and/or the second reference signal in this embodiment of this disclosure may be predefined (for example, agreed in a protocol) or preconfigured (for example, preconfigured by a terminal at factory, configured or preconfigured by the network device, or configured by a terminal).

In the method for detecting link failure of a sidelink according to this embodiment of this disclosure, the terminal may determine a link connection status of a sidelink in sidelink transmission, that is, whether link failure occurs on the sidelink, to avoid that communication parties still continue attempting to perform communication in a case of link failure, thereby improving sidelink transmission performance and reducing radio resources. In addition, when link failure occurs on the sidelink, a carrier or a resource pool of the sidelink can be updated to restore link quality of the sidelink and improve transmission performance.

The method for detecting link failure of a sidelink in different scenarios is described in the foregoing embodiment. A terminal corresponding to the method is further described below with reference to an accompanying drawing.

Figure 7:
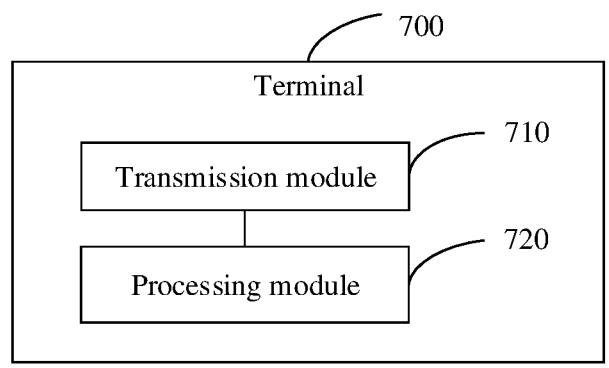
FIG. 7 is a schematic modular structural diagram of a terminal according to an embodiment of this disclosure.

As shown in FIG. 7, a terminal 700 according to an embodiment of this disclosure can implement details of the method in the foregoing embodiment: transmitting target information through a sidelink, where the target information includes a first reference signal or a data packet; and determining, if a transmission status of the target information meets a preset criterion, that no link failure occurs on the sidelink, and determining, if otherwise, that link failure occurs on the sidelink, and achieve the same effects. The terminal 700 specifically includes the following functional modules:

a transmission module 710, configured to transmit target information through a sidelink, where the target information includes a first reference signal or a data packet; and a processing module 720, configured to determine, if a transmission status of the target information meets a preset criterion, that no link failure occurs on the sidelink, and determine, if otherwise, that link failure occurs on the sidelink.

The terminal 700 further includes:
a first detection module, configured to detect whether a transmission status of the first reference signal meets a first preset criterion within a time interval;
or
a second detection module, configured to detect whether a transmission status of the data packet meets a second preset criterion within a time interval.

When the terminal 700 is a receive end, the first preset criterion includes at least one of the following:
that the first reference signal is received, and
that a measurement result of the first reference signal exceeds a first preset threshold.

When the terminal 700 is a receive end, that the first reference signal does not meet the first preset criterion includes at least one of the following:
that the first reference signal is not received, or
that a measurement result of one or more first reference signals is less than a second preset threshold.

When the terminal 700 is a transmit end, the first preset criterion includes at least one of the following:

that reception feedback information of the first reference signal being ACK is received or detected, that a quantity of failed transmissions of the first reference signal is less than a first number, and that a quantity of retransmissions of the first reference signal is less than a second number.

When the terminal 700 is a transmit end, that the first reference signal does not meet the first preset criterion includes:

that no reception feedback information of one or more first reference signals is received or detected, or that reception feedback information of one or more first reference signals being NACK is received or detected.

When the terminal 700 is a receive end, the second preset criterion includes at least one of the following:

that the data packet is received, and that a transmission quality parameter of the data packet meets a preset requirement, where the transmission quality parameter includes at least one of delay, a packet loss rate, a transmission rate, and a communication range.

When the terminal 700 is a receive end, that the data packet does not meet the second preset criterion includes:

that the data packet is not received, or that a transmission quality parameter of the data packet does not meet a preset requirement, where the transmission quality parameter includes at least one of delay, a packet loss rate, a transmission rate, and a communication range.

When the terminal 700 is a transmit end, the second preset criterion includes at least one of the following:

that reception feedback information of the data packet being ACK is received or detected, that a quantity of failed transmissions of the data packet is less than a third number, and that a quantity of retransmissions of the data packet is less than a fourth number.

When the terminal is a transmit end, that the data packet does not meet the second preset criterion includes:

that no reception feedback information of one or more data packets is received or detected, or that reception feedback information of one or more data packets being NACK is received or detected.

The time interval is a predefined or preconfigured time interval, or the time interval is a predefined or preconfigured first timer.

When the terminal 700 is a receive end, startup time of the first timer includes at least one of the following:

predefined or preconfigured first time, and time when the target information is received.

When the terminal 700 is a transmit end, startup time of the first timer includes at least one of the following:

predefined or preconfigured second time, and time after the target information is sent.

When the terminal 700 is a receive end, the restart criterion of the first timer includes at least one of the following:

that the transmission status of the target information meets the preset criterion, and that a data packet other than the target information is received.

When the terminal 700 is a transmit end, the restart criterion of the first timer includes at least one of the following:

that the transmission status of the target information meets the preset criterion, and that a data packet other than the target information is sent.

When the terminal 700 is a transmit end, the transmission module 710 includes:

a sending sub-module, configured to send the target information through the sidelink according to a preset rule, where the preset rule includes at least one of the following sending rules: sending in a preset time period, sending on a preset frequency, and sending on a preset beam.

The preset time period is a predefined or preconfigured time interval, or the preset time period is a predefined or preconfigured second timer.

Startup time of the second timer includes at least one of the following:

predefined or preconfigured third time, and time after the target information is sent for the first time.

A restart criterion of the second timer includes at least one of the following:

that the target information is sent; and that a data packet other than the target information is sent, where transmission of the target information starts when the second timer expires.

When the terminal 700 is a receive end, the terminal 700 further includes:

a receiving module, configured to receive a second reference signal sent by a transmit end;

a measuring module, configured to measure the second reference signal based on a measurement configuration to obtain a measurement result; and a sending module, configured to send the measurement result to the transmit end or a network device, so that the transmit end or the network device updates, based on the measurement result, a carrier or a resource pool used by the sidelink.

The first reference signal includes at least one of the following: a primary synchronization signal PSS, a secondary synchronization signal SSS, a channel state information reference signal CSI-RS, a demodulation reference signal DMRS, a phase tracking reference signal PTRS, a tracking reference signal TRS, a sounding reference signal SRS, and a first dedicated reference signal, where the first dedicated reference signal is used for link failure detection.

The measurement configuration includes at least one of a measurement gap configuration, a measurement target configuration, a measurement report configuration, a measurement identifier configuration, and a measurement quantity configuration.

The measurement quantity configuration includes at least one of reference signal received power RSRP, a reference signal received quality RSRQ, and a signal-to-noise-plus-interference ratio SINR of the second reference signal.

The second reference signal includes at least one of the following: a primary synchronization signal PSS, a secondary synchronization signal SSS, a channel state information reference signal CSI-RS, a demodulation reference signal DMRS, a phase tracking reference signal PTRS, a tracking reference signal TRS, a sounding reference signal SRS, and a second dedicated reference signal, where the second dedicated reference signal is used for link update measurement.

It should be noted that the terminal according to this embodiment of this disclosure may determine a link connection status of a sidelink in sidelink transmission, that is, whether link failure occurs on the sidelink, to avoid that communication parties still continue attempting to perform communication in a case of link failure, thereby improving sidelink transmission performance and reducing radio resources. In addition, when link failure occurs on the sidelink, a carrier or a resource pool of the sidelink can be updated to restore link quality of the sidelink and improve transmission performance.

It should be noted that, it should be understood that division of the modules of the terminal is merely logical function division. Some or all of the modules may be integrated into a physical entity or may be separated physically in an actual implementation. In addition, the modules may be all implemented in a form of software invoked by a processing component, or may be all implemented in a form of hardware; or some of the modules may be implemented in a form of software invoked by a processing component, and some of the modules may be implemented in a form of hardware. For example, a determining module may be a processing component that is separately disposed, or may be integrated into a chip of the apparatus for implementation. In addition, the determining module may be stored in the memory of the apparatus in a form of program code, and is invoked by a processing component of the apparatus to perform a function of the determining module. Implementation of other modules is similar to this. In addition, all or some of the modules may be integrated, or may be implemented independently. Herein, the processing component may be an integrated circuit, and has a signal processing capability. In an implementation process, steps in the foregoing method or the foregoing modules may be implemented by using an integrated logic circuit of hardware of the processor component or by using instructions in a form of software.

For example, the modules above may be one or more integrated circuits configured to implement the foregoing method, for example, one or more application-specific integrated circuits (ASIC), or one or more microprocessors (DSP), or one or more field programmable gate arrays (FPGA). For another example, when one of the foregoing modules is implemented in a form of program code invoked by a processing component, the processing component may be a general purpose processor, for example, a central processing unit (CPU) or another processor that may invoke program code. For another example, the modules may be integrated in a form of a system-on-a-chip (SOC) for implementation.

Figure 8:
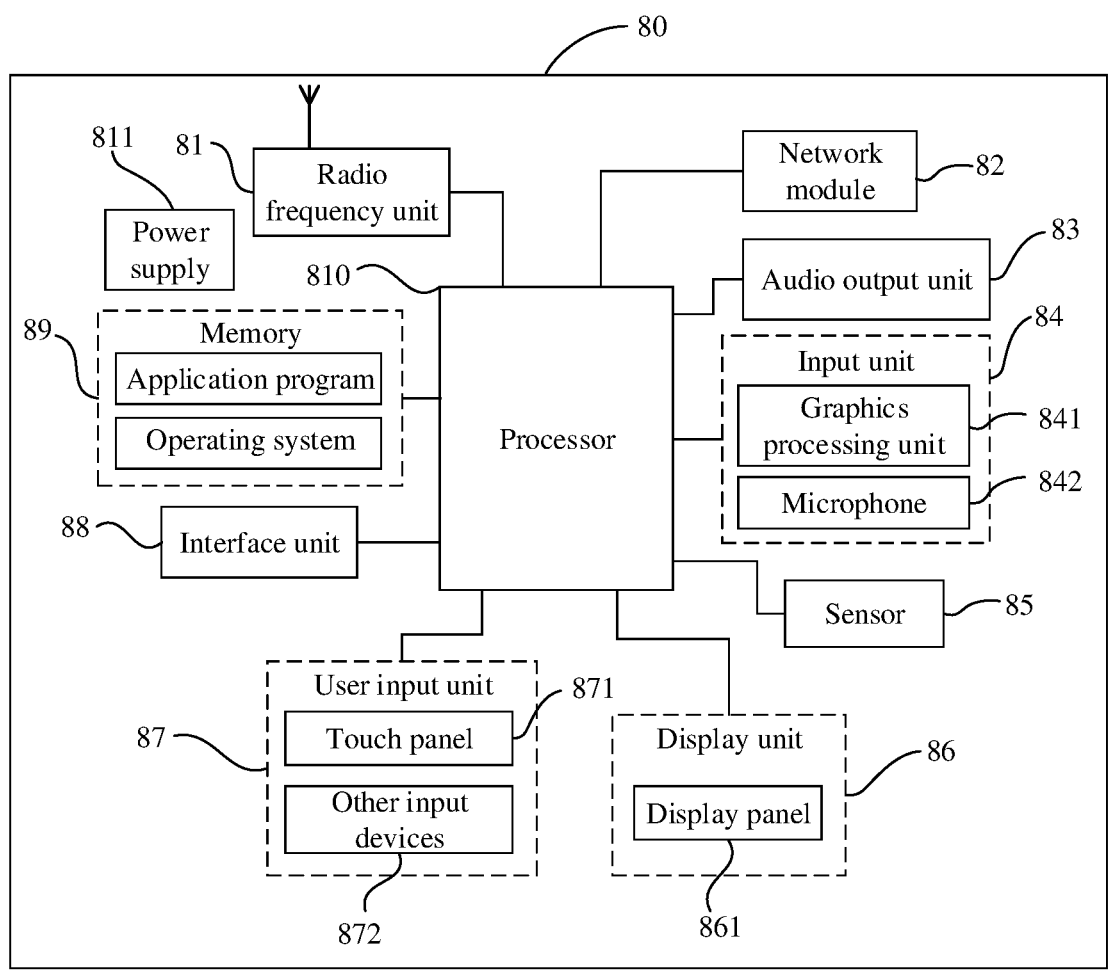
FIG. 8 is a block diagram of a terminal according to an embodiment of this disclosure.

To better achieve the foregoing objective, further, FIG. 8 is a schematic diagram of a hardware structure of a terminal for implementing each embodiment of this disclosure. The terminal 80 includes but is not limited to components such as a radio frequency unit 81, a network module 82, an audio output unit 83, an input unit 84, a sensor 85, a display unit 86, a user input unit 87, an interface unit 88, a memory 89, a processor 810, and a power supply 811. A person skilled in the art may understand that the structure of the terminal shown in FIG. 8 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency module 81 is configured to transmit target information through a sidelink, where the target information includes a first reference signal or a data packet.

The processor 810 is configured to determine, if a transmission status of the target information meets a preset criterion, that no link failure occurs on the sidelink, and determine, if otherwise, that link failure occurs on the sidelink.

The terminal according to this embodiment of this disclosure may determine a link connection status of a sidelink in sidelink transmission, that is, whether link failure occurs on the sidelink, to avoid that communication parties still continue attempting to perform communication in a case of link failure, thereby improving sidelink transmission performance and reducing radio resources. In addition, when link failure occurs on the sidelink, a carrier or a resource pool of the sidelink can be updated to restore link quality of the sidelink and improve transmission performance.

It should be understood that in this embodiment of this disclosure, the radio frequency unit 81 may be configured to receive and send information, or to receive and send a signal in a call process, and specifically, after receiving downlink data from a base station, send the downlink data to the processor 810 for processing; and also send uplink data to the base station. Generally, the radio frequency unit 81 includes but is not limited to an antenna, at least one amplifier, a transceiver, a coupler, a low noise amplifier, a duplexer, and the like. In addition, the radio frequency unit 81 may further communicate with a network and another device through a wireless communications system.

The terminal provides wireless broadband internet access for a user by using the network module 82, for example, helps the user send and receive e-mails, browse web pages, and access streaming media.

The audio output unit 83 may convert audio data received by the radio frequency unit 81 or the network module 82 or stored in the memory 89 into an audio signal and output the audio signal as a sound. In addition, the audio output unit 83 may also provide audio output (for example, a call signal received sound or a message received sound) related to a specific function performed by the terminal 80. The audio output unit 83 includes a speaker, a buzzer, a telephone receiver, and the like.

The input unit 84 is configured to receive an audio or video signal. The input unit 84 may include a graphics processing unit (GPU) 841 and a microphone 842, and the graphics processing unit 841 processes image data of a still picture or a video obtained by an image capture apparatus (for example, a camera) in an image capture mode or a video capture mode. A processed image frame may be displayed on the display unit 86. An image frame processed by the graphics processing unit 841 may be stored in the memory 89 (or another storage medium) or sent by the radio frequency unit 81 or the network module 82. The microphone 842 can receive a sound and can process the sound into audio data. The processed audio data can be converted, for outputting, into a format that can be sent to a mobile communication base station through the radio frequency unit 81 in a telephone call mode.

The terminal 80 further includes at least one sensor 85, for example, an optical sensor, a motion sensor, and another sensor. Specifically, the optical sensor includes an ambient light sensor and a proximity sensor. The ambient light sensor may adjust brightness of a display panel 861 based on intensity of ambient light. When the terminal 80 moves near an ear, the proximity sensor may disable the display panel 861 and/or backlight. As a motion sensor, an accelerometer sensor may detect for a value of an acceleration in various directions (there are usually three axes), may detect for a value and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 85 may further include a fingerprint sensor, a pressure sensor, an iris sensor, a molecular sensor, a gyroscope, a barometer, a hygrometer, a thermometer, or an infrared sensor. Details are not described herein.

The display unit 86 is configured to display information input by the user or information provided for the user. The display unit 86 may include a display panel 861, and the display panel 861 may be configured in the form of a liquid crystal display (LCD), an organic light-emitting diode (OLED), or the like.

The user input unit 87 may be configured to receive input digit or character information, and generate a key signal input related to a user setting and function control of the terminal. Specifically, the user input unit 87 includes a touch panel 871 and other input devices 872. The touch panel 871, also referred to as a touchscreen, may capture a touch operation performed by a user on or near the touch panel (for example, an operation performed by the user on the touch panel 871 or near the touch panel 871 by using any appropriate object or accessory such as a finger or a stylus). The touch panel 871 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 810, and receives and executes a command sent by the processor 810. In addition, the touch panel 871 may be implemented in a plurality of forms, for example, as a resistive, capacitive, infrared, or surface acoustic wave touch panel. The user input unit 87 may further include other input devices 872 in addition to the touch panel 871. Specifically, the other input devices 872 may include but are not limited to a physical keyboard, a function key (such as a volume control key or a power on/off key), a trackball, a mouse, a joystick, and the like. Details are not described herein.

Further, the touch panel 871 may cover the display panel 861. When detecting a touch operation on or near the touch panel 871, the touch panel 871 transmits the touch operation to the processor 810 to determine a type of a touch event. Then, the processor 810 provides a corresponding visual output on the display panel 861 based on the type of the touch event. In FIG. 8, the touch panel 871 and the display panel 861 serve as two independent components to implement input and output functions of the terminal. However, in some embodiments, the touch panel 871 and the display panel 861 may be integrated to implement the input and output functions of the terminal. This is not specifically limited herein.

The interface unit 88 is an interface for connecting an external apparatus to the terminal 80. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 88 may be configured to receive input (for example, data information and electric power) from the external apparatus, and transmit the received input to one or more elements in the terminal 80; or may be configured to transmit data between the terminal 80 and the external apparatus.

The memory 89 may be configured to store a software program and various data. The memory 89 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 89 may include a high-speed random access memory, or may include a non-volatile memory, for example, at least one magnetic disk storage device, a flash memory device, or other volatile solid-state storage devices.

The processor 810 is a control center of the terminal, connects various parts of the entire terminal by using various interfaces and lines, and executes various functions and data processing of the terminal by running or executing a software program and/or a module stored in the memory 89 and invoking data stored in the memory 89, so as to perform overall monitoring on the terminal. The processor 810 may include one or more processing units. Optionally, the processor 810 may integrate an application processor and a modem processor. The application processor mainly processes an operating system, a user interface, an application program, and the like. The modem processor mainly processes wireless communication. It may be understood that the modem processor may alternatively not be integrated into the processor 810.

The terminal 80 may further include the power supply 811 (for example, a battery) that supplies power to each component. Optionally, the power supply 811 may be logically connected to the processor 810 by using a power management system, so as to implement functions such as charging management, discharging management, and power consumption management by using the power management system.

In addition, the terminal 80 includes some functional modules that are not shown. Details are not described herein.

Optionally, an embodiment of this disclosure further provides a terminal, including a processor 810, a memory 89, and a computer program stored in the memory 89 and capable of running on the processor 810. When the computer program is executed by the processor 810, the processes of the foregoing embodiments of the method for detecting link failure of a sidelink are implemented, and a same technical effect can be achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, or a user device (or User Equipment). This is not limited herein.

An embodiment of this disclosure further provides a computer-readable storage medium, where the computer-readable storage medium stores a computer program. When the computer program is executed by a processor, the processes of the foregoing embodiments of the method for detecting link failure of a sidelink are implemented, and a same technical effect can be achieved. To avoid repetition, details are not described herein again. For example, the computer-readable storage medium is a read-only memory (ROM), a random access memory (RAM), a magnetic disk, or an optical disc.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the related art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure.

The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A method for detecting link failure of a sidelink, applied to a terminal and comprising:
   transmitting target information through a sidelink, wherein the target information comprises a data packet; and
   determining, if a transmission status of the target information meets a preset criterion, that no link failure occurs on the sidelink, and determining, if otherwise, that link failure occurs on the sidelink;
   wherein before the step of determining, if a transmission status of the target information meets a preset criterion, that no link failure occurs on the sidelink, the method further comprises:
   detecting whether a transmission status of the data packet meets a second preset criterion within the time interval;
   wherein when the terminal is a transmit end, the second preset criterion comprises at least one of the following:

that reception feedback information of the data packet being ACK is received or detected, that a quantity of failed transmissions of the data packet is less than a third number, and that a quantity of retransmissions of the data packet is less than a fourth number.

2. The method for detecting link failure of a sidelink according to claim 1, wherein that a transmission status of the data packet does not meet a second preset criterion comprises:

that no reception feedback information of one or more data packets is received or detected, or that reception feedback information of one or more data packets being NACK is received or detected.

3. The method for detecting link failure of a sidelink according to claim 1, wherein the time interval is a predefined or preconfigured first timer;

wherein startup time of the first timer comprises at least one of the following:

predefined or preconfigured second time, and time after the target information is sent.

4. The method for detecting link failure of a sidelink according to claim 1, wherein the time interval is a predefined or preconfigured first timer;

wherein a restart criterion of the first timer comprises at least one of the following:

that the transmission status of the target information meets the preset criterion, and that a data packet other than the target information is sent.

5. The method for detecting link failure of a sidelink according to claim 1, wherein the step of transmitting target information through the sidelink comprises:

sending the target information through the sidelink according to a preset rule, wherein the preset rule comprises at least one of the following sending rules: sending in a preset time period, sending on a preset frequency, and sending on a preset beam.

6. The method for detecting link failure of a sidelink according to claim 5, wherein the preset time period is a predefined or preconfigured time interval, or the preset time period is a predefined or preconfigured second timer.

7. The method for detecting link failure of a sidelink according to claim 6, wherein startup time of the second timer comprises at least one of the following:

predefined or preconfigured third time, and time after the target information is sent for the first time; or, wherein a restart criterion of the second timer comprises at least one of the following:

that the target information is sent, and that a data packet other than the target information is sent, wherein transmission of the target information starts when the second timer expires.

8. A terminal, wherein the terminal comprises a processor, a memory, and a computer program stored in the memory and running on the processor, and the processor executes the computer program to perform steps of:

transmitting target information through a sidelink, wherein the target information comprises a data packet; and determining, if a transmission status of the target information meets a preset criterion, that no link failure occurs on the sidelink, and determining, if otherwise, that link failure occurs on the sidelink;

wherein before determining, if a transmission status of the target information meets a preset criterion, that no link failure occurs on the sidelink, the processor executes the computer program to perform steps of: detecting whether a transmission status of the data packet meets a second preset criterion within the time interval;

wherein when the terminal is a transmit end, the second preset criterion comprises at least one of the following:

that reception feedback information of the data packet being ACK is received or detected, that a quantity of failed transmissions of the data packet is less than a third number, and that a quantity of retransmissions of the data packet is less than a fourth number.

9. The terminal according to claim 8, wherein that a transmission status of the data packet does not meet a second preset criterion comprises:

that no reception feedback information of one or more data packets is received or detected, or that reception feedback information of one or more data packets being NACK is received or detected.

10. The terminal according to claim 8, wherein the time interval is a predefined or preconfigured first timer;

wherein startup time of the first timer comprises at least one of the following:

predefined or preconfigured second time, and time after the target information is sent.

11. The terminal according to claim 8, wherein the time interval is a predefined or preconfigured first timer;

wherein a restart criterion of the first timer comprises at least one of the following:

that the transmission status of the target information meets the preset criterion, and that a data packet other than the target information is sent.

12. The terminal according to claim 8, wherein when transmitting target information through the sidelink, the processor executes the computer program to perform steps of:

sending the target information through the sidelink according to a preset rule, wherein the preset rule comprises at least one of the following sending rules: sending in a preset time period, sending on a preset frequency, and sending on a preset beam.

13. The terminal according to claim 12, wherein the preset time period is a predefined or preconfigured time interval, or the preset time period is a predefined or preconfigured second timer.

14. The terminal according to claim 13, wherein startup time of the second timer comprises at least one of the following:

predefined or preconfigured third time, and time after the target information is sent for the first time; or, wherein a restart criterion of the second timer comprises at least one of the following:

that the target information is sent, and that a data packet other than the target information is sent, wherein transmission of the target information starts when the second timer expires.

15. A non-transitory computer-readable storage medium, wherein the computer-readable storage medium stores a computer program, and the computer program is executed by a processor of a terminal to perform steps of:

transmitting target information through a sidelink, wherein the target information comprises a first reference signal or a data packet; and determining, if a transmission status of the target information meets a preset criterion, that no link failure occurs on the sidelink, and determining, if otherwise, that link failure occurs on the sidelink;

wherein before determining, if a transmission status of the target information meets a preset criterion, that no link failure occurs on the sidelink, the computer program is executed by the processor to perform steps of: detecting whether a transmission status of the data packet meets a second preset criterion within the time interval;

wherein when the terminal is a transmit end, the second preset criterion comprises at least one of the following:

that reception feedback information of the data packet being ACK is received or detected, that a quantity of failed transmissions of the data packet is less than a third number, and that a quantity of retransmissions of the data packet is less than a fourth number.

16. The non-transitory computer-readable storage medium according to claim 15, wherein that a transmission status of the data packet does not meet a second preset criterion comprises:

that no reception feedback information of one or more data packets is received or detected, or that reception feedback information of one or more data packets being NACK is received or detected.

17. The non-transitory computer-readable storage medium according to claim 15, wherein the time interval is a predefined or preconfigured first timer;

wherein startup time of the first timer comprises at least one of the following:

predefined or preconfigured second time, and time after the target information is sent.

18. The non-transitory computer-readable storage medium according to claim 15, wherein the time interval is a predefined or preconfigured first timer;

wherein a restart criterion of the first timer comprises at least one of the following:

that the transmission status of the target information meets the preset criterion, and that a data packet other than the target information is sent.

19. The non-transitory computer-readable storage medium according to claim 15, wherein when transmitting target information through the sidelink, the computer program is executed by the processor of the terminal to perform steps of:

sending the target information through the sidelink according to a preset rule, wherein the preset rule comprises at least one of the following sending rules: sending in a preset time period, sending on a preset frequency, and sending on a preset beam.

20. The non-transitory computer-readable storage medium according to claim 19, wherein the preset time period is a predefined or preconfigured time interval, or the preset time period is a predefined or preconfigured second timer.

* * * * *